Aug. 1, 1967 D. T. KAN ET AL 3,334,311
ADJUSTABLE-FREQUENCY ASTABLE MULTIVIBRATOR
Filed March 24, 1966
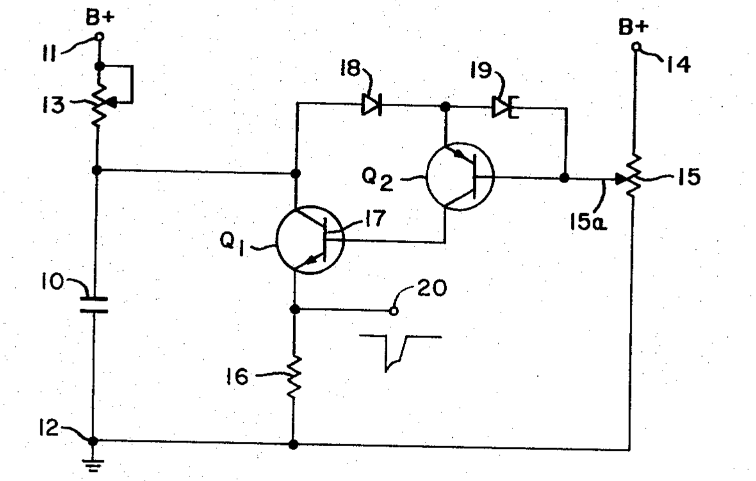

United States Patent Office 3,334,311

Patented Aug. 1, 1967

3,334,311

ADJUSTABLE-FREQUENCY ASTABLE MULTIVIBRATOR

David T. Kan, Fort Lee, N.J., and Julius G. Rakonitz, Menlo Park, Calif., assignors to Fairchild Camera and Instrument Corporation, a corporation of Delaware Filed Mar. 24, 1966, Ser. No. 537,196
4 Claims. (Cl. 331—111)

ABSTRACT OF THE DISCLOSURE

An astable multivibrator comprising a capacitor charged from a variable vlotage source and discharged through a normally nonconductive transistor and a load resistor in series. The base of the transistor is connected to the high-potential terminal of the capacitor through a second normally nonconductive transistor. The base of the second transistor is connected to a source of reference potential lower than that of the first voltage source and, through two back-biased series diodes, to the high-potential terminal of the capacitor. At starting, after the capacitor has been charged to a given potential, the back bias is removed from the diodes, both transistors are rendered conductive, and the capacitor rapidly discharges, developing a potential pulse across the load resistor.

This invention relates to adjustable-frequency astable multivibrators and particularly to such multivibrators of the type having a substantially linear voltage-frequency characteristic over a wide range of frequencies.

In digital data processing and programming systems, the need frequently arises for a pulse repetition rate generator which has a frequency varying precisely linearly with variations of a control quantity such as a control voltage over a wide range of frequencies. In such systems, it is frequenly desirable to be able to vary the control parameter from a remote station. In such a system, if the control voltage is varied in discrete digital increments, the repetition rate or frequency of the generator will vary in corresponding discrete increments. Multivibrator circuits are particularly suitable for use as repetition rate generators.

Heretofore there have been provided numerous astable mutivibrator circuits generally comprising a storage capacitor, a charging circuit for the capacitor including a first electronic valve and a discharge circuit including a second electronic valve. It has been customary to control the conductivities of the charging and discharging valves in response to variations of the charge on the capacitor.

In a multivibrator circuit of the type described, if it is desired to vary the frequency or repetition rate of the output pulses, this is conventionally effected by adjusting the charging voltage. Such a control of frequency has the distinct disadvantage that the relationship between the adjustment of the voltage and frequency is decidedy nonlinear so that it is unsuitable for use in a digitally programmed system.

It is an object of the invention, therefore, to provide a new and improved adjustable-frequency astable multivibrator which obviates the above-mentioned limitation on prior circuits of this type.

It is a further object of the invention to provide a new and improved adjustable-frequency astable multivibrator having an applied voltage-frequency characteristic substantially linear over a wide range of frequencies.

In accordance with the invention, there is provided an astable multivibrator having a substantially linear voltage-frequency characteristic over a wide range of frequencies comprising a storage capacitor, a variable-voltage input circuit connected across the capacitor to charge the same, and a discharge circuit for said capacitor including in series a load resistor and a normally nonconductive electronic valve having a conductivity-controlling electrode. The multivibrator further comprises a voltage-responsive unilaterally conductive device and a second electronic valve connected in series between the high-potential terminal of the capacitor and the conductivity-controlling electrode of the valve, such second electronic valve having a conductivity-controlling electrode, and means independent of the input circuit for biasing the conductivity-controlling electrode of the second electronic valve and the unilaterally conductive device to a nonconductive state until the charge on the capacitor reaches a predetermined value, whereupon the device and the valve become conductive to discharge the capacitor. The term "normally" is used herein and in the appended claims to refer to the portion of the operating cycle of the multivibrator during which the storage capacitor is charged. The term "frequency" is used herein and in the appended claims in its broad sense as including pulse repetition rate.

For a better understanding of the present invention, together with other and further objects thereof, reference is had to the following description, taken in connection with the accompanying drawing, while its scope will be pointed out in the appended claims.

Referring now to the drawing:

The single figure is a schematic circuit diagram of an adjustable-frequency astable multivibrator embodying the invention.

Referring now more particuarly to the drawing, there is represented schematically an astable multivibrator having a substantially linear voltage-frequency characteristic over a wide range of frequencies comprising a storage capacitor 10 and a variable-voltage input circuit connected across the capacitor to charge the same. This variable-voltage input circuit may take the form of a constant-voltage input circuit 11, 12 and an adjustable resistor 13 through which the capacitor 10 is connected to the input circuit 11, 12.

The multivibrator further includes a source of reference voltage which may be in the form of a constant-voltage refrence circuit 14, 12 and a resistor 15 connected across the circuit 14, 12 and having an adjustabe tap 15*a*.

The multivibrator circuit further comprises a discharge circuit for the capacitor 10 including a load resistor 16 and a normally nonconductive electronic valve $Q_1$ having a conductivity-controlling electrode such as a base electrode 17, connected to the source of reference voltage, specifically to the tap 15*a*, through a circuit to be described. The multivibrator further comprises a voltage-responsive unilaterally conductive device such as a diode 18 and a second electronic valve, specifically a transistor $Q_2$, connected in series between the high-potential terminal of capacitor 10 and the base electrode 17.

The multivibrator circuit further comprises means for biasing the diode 18 to a nonconductive state until the charge on the capacitor 10 reaches a predetermined value. This biasing means comprises a second unilaterally conductive device, specifically a diode 19, connected between the diode 18 and the source of reference voltage, that is, the tap 15*a*, whereby the first diode 18 and the transistor $Q_2$ are maintained nonconductive until the charge on the capacitor 10 reaches the predetermined value. An output pulse may be derived from across the load resistor 16 at output terminals 20, 12, the output pulse having a wave form such as illustrated below the terminal 20.

It is believed the operation of the multivibrator circuit embodying the invention will be apparent from the foregoing description. In brief, assuming that power is initially applied to input terminals 11, 12 so that the charge on the capacitor 10 is zero or relatively small, the potential of the collector of transistor $Q_1$ is sufficiently low relative to the potential of its base electrode 17 that it is nonconductive. Likewise, the potential across the diodes 18 and 19 is such as to back-bias these diodes so that they are non-conductive. The capacitor 10 is then charged through the resistor 13 and, when the high-potential terminal of the capacitor 10 has risen to a predetermined value, the potential across the diodes 18 and 19 in series becomes of proper value and polarity to render these devices conductive. Thereupon, the potential across capacitor 10 is applied via the diodes 18 and 19 to the base electrode of transistor $Q_2$ to render it conductive and via the transistor $Q_2$ to the base electrode 17 of transistor $Q_1$ to render it conductive. Preferably, the transistors $Q_1$ and $Q_2$ operate at saturation while conductive. The value of the load resistor 16 of transistor $Q_1$ is sufficiently low that the capacitor 10 is rapidly discharged, giving rise to the negative pulse of output potential at the terminal 20, as illustrated. When the potential across the capacitor 10 has fallen below a predetermined value, the diodes 18 and 19 again become back-biased and nonconductive, rendering the transistors $Q_2$ and $Q_1$, in turn, likewise nonconductive and the cycle described is repeated.

It has been determined that the voltage-frequency characteristic of the multivibrator described is substantially linear over a wide range of frequencies. Therefore, the operating frequency of the multivibrator can be easily adjusted by adjustment of the value of the resistor 13. This can be easily effected from a remote position by any suitable servomechanism.

While the design parameters of the mutivibrator circuit of the invention may be varied widely, depending upon the desired operating range and application, one set of design parameters which has been found to give satisfactory results is the following:

| | | |
|---|---|---|
| Resistor 13 | kilohms | 100 |
| Resistor 15 | do | 250 |
| Resistor 16 | ohms | 100 |
| Capacitor 10 | μf | 0.01 |
| Transistor $Q_1$ | | Type 2N697 |
| Transistor $Q_2$ | | Type 2N964 |
| Diode 18 | | Type FD100 |
| Diode 19 | | Type 1N2939 |
| Frequency range | | (1) |

[1] 20 cycles to 70 megacycles.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An astable multivibrator having a substantialy linear voltage-frequency characteristic over a wide range of frequencies comprising:
   - a storage capacitor;
   - a variable-voltage input circuit connected across said capacitor to charge the same;

- a discharge circuit for said capacitor including in series a load resistor and a normally nonconductive first electronic valve having a conductivity-controlling electrode;
   - a voltage-responsive unilaterally conductive device and a second electronic valve connected in series between the high-potential terminal of said capacitor and said electrode, said second electronic valve having a conductivity-controlling electrode;
   - and means independent of said input circuit for biasing said conductivity-controlling electrode of said second electronic valve and said device to a nonconductive state until the charge on said capacitor reaches a predetermined value,
   - whereupon said device and said first valve become conductive to discharge said capacitor.

2. An astable multivibrator having a substantially linear voltage-frequency characteristic over a wide range of frequencies comprising:
   - a storage capacitor;
   - a variable-voltage input circuit connected across said capacitor to charge the same;
   - a source of reference voltage;
   - a discharge circuit for said capacitor including in series a load resistor and a normally nonconductive first electronic valve having a conductivity-controlling electrode;
   - a voltage-responsive first unilaterally conductive device and a second electronic valve connected in series between the high-potential terminal of said capacitor and said electrode, said second electronic valve having a conductivity-controlling electrode connected to said source of reference voltage;
   - and a second unilaterally conductive device connected between the junction of said second electronic valve and said first device on the one hand and said source of reference voltage on the other hand, whereby said first device and said second valve are maintained nonconductive until the charge on said capacitor reaches a predetermined value,
   - whereupon said first device and said first valve become conductive to discharge said capacitor.

3. An astable multivibrator having a substantially linear voltage-frequency characteristic over a wide range of frequencies comprising:
   - a storage capacitor;
   - a variable-voltage input circuit connected across said capacitor to charge the same;
   - a constant-voltage reference circuit;
   - a resistor connected across said reference circuit and having an adjustable tap;
   - a discharge circuit for said capacitor including in series a load resistor and a normally nonconductive first electronic valve having a conductivity-controlling electrode;
   - a voltage-responsive first unilaterally conductive device and a second electronic valve connected in series between the high-potential terminal of said capacitor and said electrode, said second electronic valve having a conductivity-controlling electrode connected to said source of reference voltage;
   - and a second unilaterally conductive device connected between the junction of said second electronic valve and said first device on the one hand and said adjustable tap on the other hand, whereby said first device and said second valve are maintained nonconductive until the charge on said capacitor reaches a predetermined value,
   - whereupon said first device and said first valve become conductive to discharge said capacitor.

4. An astable multivibrator having a substantially linear voltage-frequency characteristic over a wide range of frequencies comprising:
   - a storage capacitor;

a variable-voltage input circuit connected across said capacitor to charge the same;

a source of reference voltage;

a discharge circuit for said capacitor including in series a load resistor and a normally nonconductive first electronic valve having a conductivity-controlling electrode connected to said source of reference voltage;

a voltage-responsive first unilaterally conductive device and a second electronic valve connected in series between the high-potential terminal of said capacitor and said electrode, said second electronic valve having a conductivity-controlling electrode connected to said source of reference voltage;

and a second unilaterally conductive device connected between the junction of said second electronic valve and said first device on the one hand and said source of reference voltage on the other hand, whereby said first device and second second valve are maintained nonconductive until the charge on said capacitor reaches a predetermined value, whereupon said first device and said first valve become conductive to discharge said capacitor.

References Cited

UNITED STATES PATENTS

| | | | |
|---|---|---|---|
| 3,229,225 | 1/1966 | Schimpf | 331—111 |
| 3,287,975 | 11/1966 | Mason et al, | 331—111 |

OTHER REFERENCES

Klein, Electronic Design, "Neon Bulb Controls Astable MV," page 64, Sept. 27, 1963, 331—111.

Dorsey, RCA Tech. Notes, "Zener Controlled Oscillator," RCA TN No. 612, March 1965, 2 shts. 331—11.

ROY LAKE, *Primary Examiner.*

JOHN KOMINSKI, *Examiner.*